ical-12)United States Patent (10) Patent No.: US 7,796,358 B1
Tchekanov et al. (45) Date of Patent: Sep. 14, 2010

(54) METHOD AND APPARATUS FOR ELIMINATING SPIKE NOISE IN A SOFT MAGNETIC UNDERLAYER

(75) Inventors: Albert Tchekanov, San Jose, CA (US); Robert Weng, San Jose, CA (US); E. Noel Abarra, Santa Clara, CA (US); Michael Mallary, Sterling, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 1041 days.

(21) Appl. No.: 11/366,080

(22) Filed: Mar. 2, 2006

Related U.S. Application Data (60) Provisional application No. 60/659,031, filed on Mar. 4, 2005.

(51) Int. Cl.
*G11B 17/02* (2006.01)
(52) U.S. Cl. .................................... 360/99.12
(58) Field of Classification Search ............... 360/99.12, 360/99.06
See application file for complete search history.

(56) References Cited

U.S. PATENT DOCUMENTS

2006/0286412 A1* 12/2006 Jung ........................... 428/826
2007/0231603 A1* 10/2007 Ohashi .................... 428/692.1
2008/0074783 A1* 3/2008 Ohashi ................... 360/119.02

* cited by examiner

*Primary Examiner*—Allen T Cao
(74) *Attorney, Agent, or Firm*—Dergosits & Noah LLP (57) ABSTRACT

A system for reducing spike noise in a perpendicular recording medium having a soft underlayer is provided. The system radially biases the soft underlayer to substantially eliminate domain walls therein. In a first embodiment of the system, a permanent magnetic bias ring is disposed generally adjacent to the soft underlayer and a magnetic circuit is formed between the magnetic ring and the soft underlayer. Other embodiments include a concentric stationary magnetic flux return disk to extend the radial distance of the flux path. In alternative embodiments, a ferromagnetic spindle assembly is modified to produce a radiation pattern that has a net radial exterior field that biases the adjacent soft underlayer of the medium. The entire assembly can be shielded from external magnetic fields in the disk drive. Further, the shielding may operate as part of the magnetic circuit.

20 Claims, 9 Drawing Sheets

METHOD AND APPARATUS FOR ELIMINATING SPIKE NOISE IN A SOFT MAGNETIC UNDERLAYER

CROSS-REFERENCE TO RELATED APPLICATION

The present application claims the benefit of U.S. Provisional Patent Application Ser. No. 60/659,031, which was filed on Mar. 4, 2005, by Chekanov, et al. for a MAGNETIC DISK APPARATUS WITH EXTERNAL MAGNETIC FIELD-BIASED PERPENDICULAR RECORDING MEDIA, which provisional application is hereby incorporated by reference as though fully set forth herein.

BACKGROUND OF THE INVENTION

1. Field of the Invention

The present invention is related to perpendicular magnetic recording systems, and in particular, to reduction of spike noise associated with domain walls in the soft magnetic underlayer of the media.

2. Background Information

Recently, the trend in magnetic recording apparatus is to employ perpendicular magnetic recording. In perpendicular magnetic recording, the magnetic domains of the bits are aligned perpendicularly to the surface of the disk platter. This allows bits to be placed closed together on the platter, thus increasing storage density over that which has been achieved in conventional longitudinal recording. Further, longitudinal magnetic recording is approaching an upper limit of bit density due to the super paramagnetic effect. The super paramagnetic effect relates to the energy required to change the direction of the magnetic moment of fine particles. The magnetic moment of the fine particles is affected by ambient thermal energy. Thus, at a certain point, the rate at which particles randomly reverse direction becomes significant. This is particularly relevant in hard disk technology because if the particles randomly reverse direction due to the super paramagnetic effect, then data is lost over time. Thus, the super paramagnetic effect limits the minimum size of particles that can be used without a significant loss of data over time. Perpendicular recording, however, changes the geometry of the disk and thus allows a greater bit density with lesser disadvantages due to the super paramagnetic effect. Accordingly, perpendicular magnetic recording has become a more favored recording technique in hard disk technology.

Perpendicular magnetic recording utilizes a soft magnetic underlayer (also referred to as the "SUL"), which serves as a conduit for the magnetic recording flux. The flux emanates from a monopole writing element, and is directed through the recording layer and returns through the soft underlayer and back to the writing element. Thus, it is desirable that the soft magnetic underlayer exhibit low coercivity, high saturation magnetization and moderate but constant permeability in the range of the write fields.

However, demagnetizing fields at the outer and inner edges of a magnetic disk give rise to the formation of complex closure domain structures ("domain walls") which can interfere with the storage medium flux and result in a phenomenon known as "spike noise." Specifically, domain walls form between adjacent regions in the soft underlayer that are magnetized radially outwardly and radially inwardly. In between the two regions, the magnetization must cross a domain wall, that is, change direction, which causes the magnetic flux to rotate outwardly in a perpendicular orientation and then back down to the plane of the disk. While the flux is pointed generally perpendicular to the disk, the magnetic flux creates a spike, (commonly known as "spike noise"). The spike noise can reach the read head and cause errors. The spike can be approximately 1 micron wide, and can thus affect about 40 bits of data, possibly creating read errors in those 40 bits of data.

Some techniques have been suggested for eliminating spike noise by layering the soft underlayer for better reduction of demagnetizing fields. Such methods may involve using a hard bias layer as one of the layers within the soft underlayer. However, this requires special manufacturing of the disk, thereby increasing the complexity and cost of manufacture. In other techniques additional field-setting steps are taken during disk manufacture to align the soft underlayer moments in a radial direction. These additional steps also involve additional complexities and costs.

There remains a need, therefore, for a cost effective method and apparatus for eliminating domain walls in a soft underlayer, thereby reducing the effects of spike noise in perpendicular magnetic recording media.

SUMMARY OF THE INVENTION

These and other disadvantages of prior techniques are overcome by the present invention, which is a method and apparatus for radially biasing a soft underlayer in a perpendicular recording medium, in order to eliminate domain walls and thereby reduce spike noise. More specifically, in a first embodiment of the invention, an appropriately magnetized permanent magnet element, situated in proximity to the soft underlayer, creates an adequate biasing field which reduces or eliminates domain walls in the soft magnetic underlayer. This permanent magnet element may comprise a permanent magnetic ring, such as a clamp washer, that is placed generally adjacent to the soft underlayer on the disk spindle during drive assembly. The magnetic field produced by the permanent magnetic ring results in a radial magnetic bias in the soft magnetic underlayer. This radial field bias reduces spike noise and thus improves associated signal to noise performance. The apparatus may also include a shield against external fields. In accordance with another aspect of the invention, a magnetically permeable washer can be placed between the shield and the disk assembly, such that the shield becomes a part of the flux path for conducting flux radially into the soft underlayer.

In accordance with further aspects of the invention, a ferromagnetic spindle assembly is constructed such that a magnetic element, such as the motor magnet or a stationary ring magnet, has an associated radial flux component that radially biases the soft underlayer of the associated disk. Flux return elements are employed in several embodiments to complete the magnetic circuit. The flux return elements may be concentric stationary magnetic flux return elements which act to extend the radial dimension of the flux path.

One of various exemplary magnetization patterns can be utilized to produce the radial flux component of the present invention. In the ferromagnetic spindle assembly embodiment, the assembly is configured to produce a modified Halbach magnetization pattern that has a net radial exterior field that biases the adjacent soft underlayer of the medium. The entire spindle assembly and disk may be enclosed within a shield to reduce the effects of external magnetic fields within the disk drive. This shield can be adapted to become part of the magnetic circuit in accordance with illustrative embodiments of the invention.

BRIEF DESCRIPTION OF THE DRAWINGS

The above and further advantages of the invention are better illustrated with reference to the accompanying drawings in which.

DETAILED DESCRIPTION OF AN ILLUSTRATIVE EMBODIMENT

Figure 1:
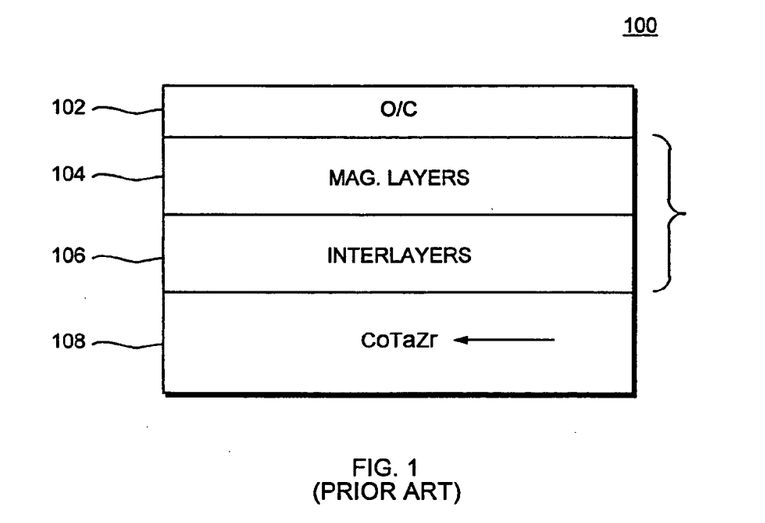
FIG. 1 is a schematic cross section of a perpendicular recording disk with which the present invention may be employed.

FIG. 1 illustrates a cross section of a disk 100 with which the techniques and apparatus of the present invention may be employed in order to eliminate domain walls, and thereby, reduce the effects of spike noise in the soft underlayer of a perpendicular recording medium. More specifically, the disk 100 contains a first layer 102 which is a mechanical protective layer comprised primarily of carbon. The layer 102 protects the magnetic layer 104, where the data is stored. Intermediate layer 106 is used to aid in obtaining a perpendicular orientation of the magnetic moments in the layer 104. The soft underlayer 108 may be comprised of an alloy of cobalt/tantalum/zirconium (CoTaZr) and ruthenium (Ru). The soft underlayer 108 provides the magnetic return path for the flux during read and write operations involving the perpendicular recording disk.

Figure 2:
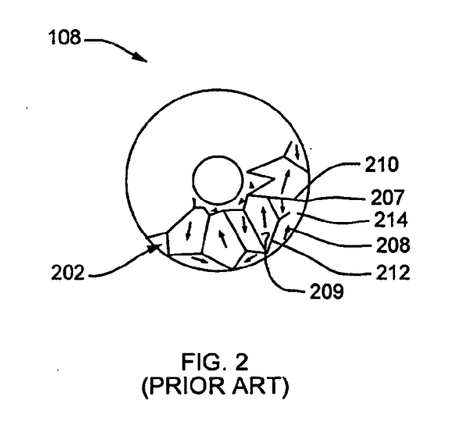
FIG. 2 is a top plan view of the soft underlayer of the disk of FIG. 1 illustrating domain walls.

FIG. 2 is a top plan view of the soft underlayer 108. The magnetic structure 202 in the layer 108 has several high noise generating patterns 207, 208 and 209 that include domain walls such as 210, 212 and 214, which lead to spike noise as described herein.

Figure 3:
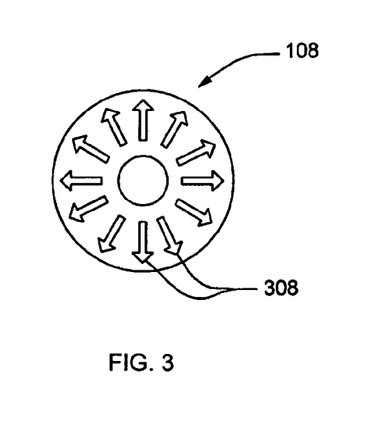
FIG. 3 is a schematic top plan view of the soft underlayer of the disk of FIG. 1 which has been radially biased in accordance with the techniques of the present invention.

FIG. 3 illustrates a top plan view of a soft underlayer 108 after it is biased in a radial direction (shown schematically by arrows 308) in accordance with the invention.

As is apparent in FIG. 3, there are no domain walls due to the application of the radial bias in accordance with the present invention which thus reduces spike noise.

Figure 4:
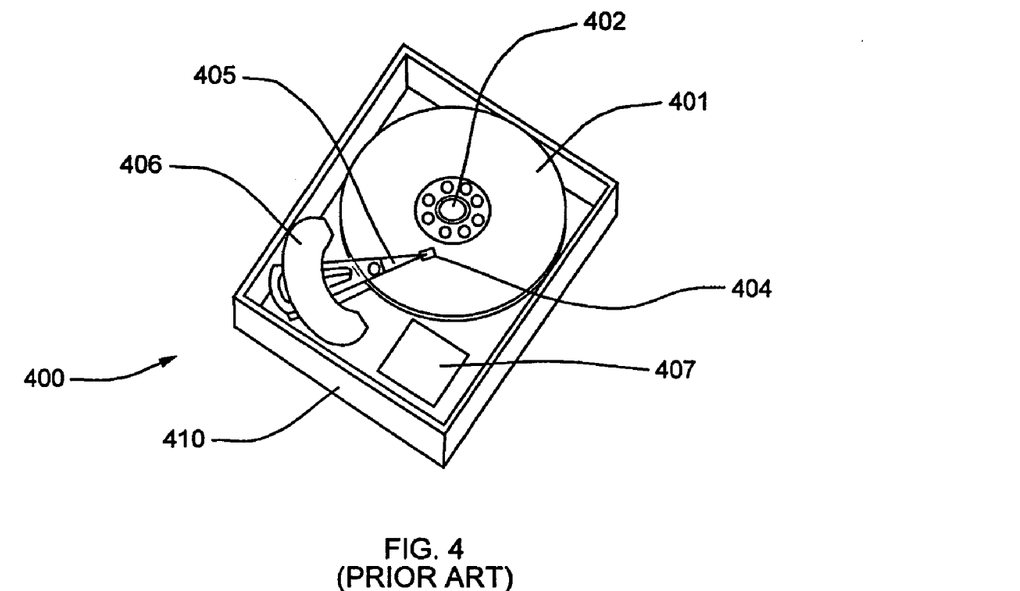
FIG. 4 is a schematic isometric illustration of a perpendicular disk drive apparatus with which the present invention may be used.

By way of further background illustration, FIG. 4 illustrates a perpendicular recording hard disk drive 400 having disk media 401 which is mounted on a drive spindle motor (not shown) and secured by a disk clamp 402. A disk media drive recording head 404, head suspension 405, head actuator 406, and head preamplifier 407 are all placed within a drive casing 410. Upon starting the disk drive operation, the drive motor provides disk rotation at a specified velocity. The head actuator 406 enables fast and accurate access by the recording head 404 to data on the disk surface 401. The preamplifier 407 operates in a conventional manner to condition the read signals.

Figure 5:
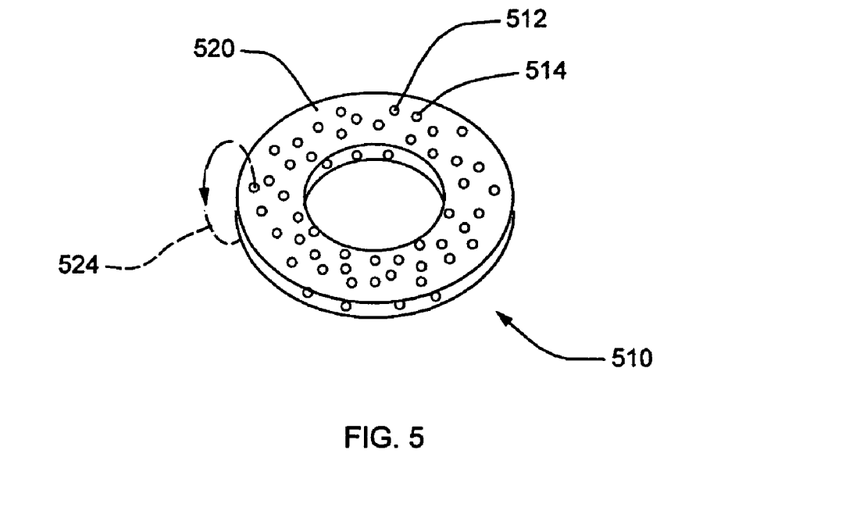
FIG. 5 is a schematic isometric illustration of an illustrative embodiment of the invention comprising a permanent magnet bias ring.

In accordance with an illustrative embodiment of the present invention, FIG. 5 depicts a ferromagnetic component comprising a permanent magnet bias ring 510. The permanent magnet bias ring 510 is substantially comprised of ferrite particles 512, 514 that are disposed within a conductive epoxy 520. The permanent magnet bias ring 510 can be machined or sintered directly into a desired shape and thickness in accordance with the particular application in which the invention is to be employed.

The magnetization of the permanent magnet bias ring 510 may have one of a variety of orientations. For example, the ring 510 can be magnetized perpendicular to its plane as illustrated by the flux line 524 (FIG. 5) so that at its surface there is generated an adequate magnetic field of a magnitude on the order of a few hundred Oersteads at the top surface of the ring. This field will fall with distance from the ring so the design must provide for the radial component of the field at the periphery of the disk to exceed the coercivity of the SUL. Alternatively, the permanent magnet bias ring 510 can have a longitudinal orientation of the magnetization relative to the disk surface, while remaining within the scope of the present invention.

As described herein the bias ring 510 is placed proximate to the soft underlayer of the disk (not shown in FIG. 5), such that the stray magnetic field is applied as a bias field to the soft underlayer. The magnetic field strength of the bias ring 510 exceeds the soft underlayer's low coercivity, and thus, biases the soft underlayer in the desired radial direction. The field strength is not, however, strong enough to adversely affect data recorded in the perpendicular storage layer (104, FIG. 1) which has a coercivity of 4-6 kilo Oersteads.

Figure 6:
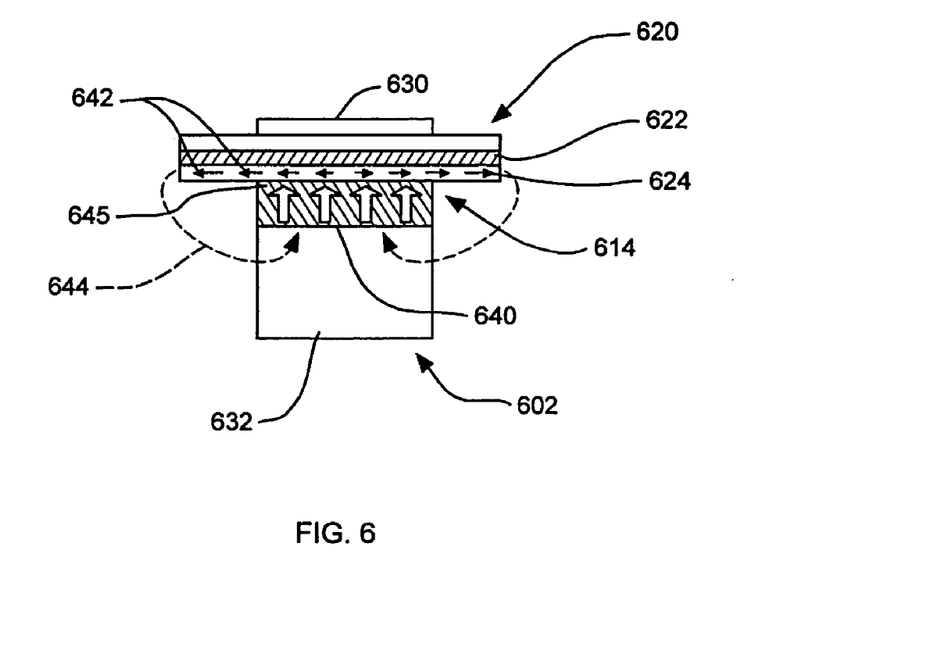
FIG. 6 is a schematic side section of a perpendicular recording disk and a permanent magnetic bias clamp washer in accordance with an illustrative embodiment of the present invention adjacent to the soft underlayer for use with a non-magnetic spindle.

The ferrite ring 510 of FIG. 5 can be employed in the embodiment of the present invention illustrated in FIG. 6 which depicts a non-magnetic spindle assembly 602. The spindle assembly 602 rotates a magnetic disk 620 that has at least a recording layer 622 and a soft underlayer 624. The disk 620 is clamped to the spindle assembly 602 with an upper clamp 630 and a ferromagnetic lower clamp 632. A permanent magnet ring 614 functions in accordance with this embodiment of the present invention as a washer that is fixed adjacent to the soft underlayer 624 of the disk 620 and held in place using the upper clamp 630 and the lower clamp 632. The lower clamp 632 is relatively tall, to allow the magnetic poles at the far end of the permanent magnetic ring washer 614 to be moved further away from the disk 620 so that they do not act to cancel the field of the poles at the surface 645 of the washer that abuts the disk.

The magnetic flux generated by the permanent magnetic ring washer 614 is channeled through the soft underlayer 624 towards the outer edge of the disk 620. The axial direction of the bias field in the washer 614 is illustrated by the arrows 640. This axial field is thus converted in the soft underlayer 624 into a radial longitudinal field illustrated by the arrows 642. The magnetic flux returns as illustrated by the arrows 644 through the air and back into the permanent magnetic ring washer 614 to complete the circuit. In this way, the soft underlayer 624 of the disk 620 is radially biased in accordance with the invention.

Figure 7:
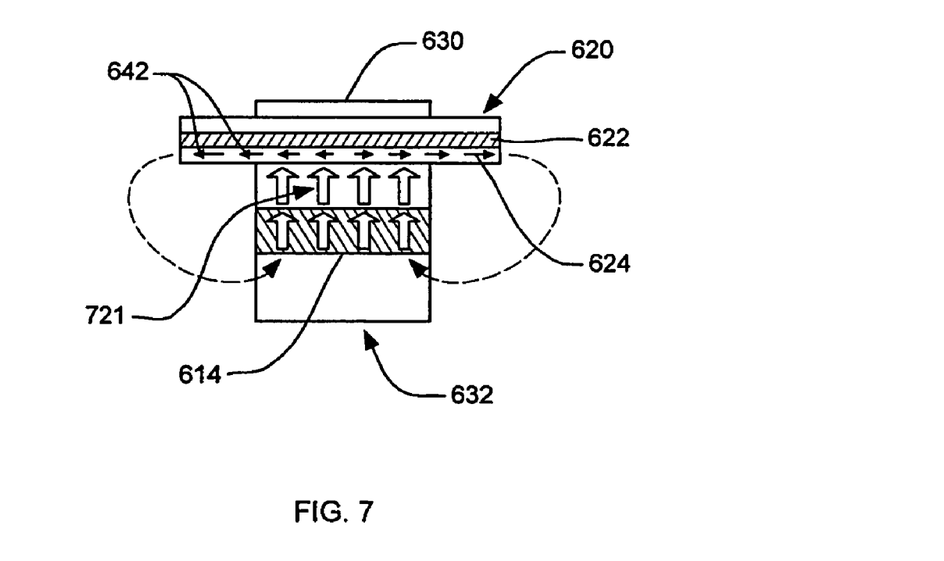
FIG. 7 is schematic side section of a permanent magnetic bias clamp washer used with a flux conducting washer in accordance with the present invention for use with a non-magnetic spindle assembly.

A further aspect of the invention is illustrated in FIG. 7 in which like components have the same reference numerals as in FIG. 6. Notably, the embodiment of FIG. 7 is also for use with a non-magnetic spindle. The embodiment of FIG. 7 further includes a flux conducting washer 721. The flux conducting washer 721 is placed adjacent to the soft underlayer 624 of the disk 620. The permanent magnetic ring washer 614 is then placed adjacent to the flux conducting washer 720 such that the flux illustrated by the arrows 640 travels axially through the magnetic ring washer 614 and into the flux conducting washer 721, and then into the soft underlayer 624.

Figure 8:
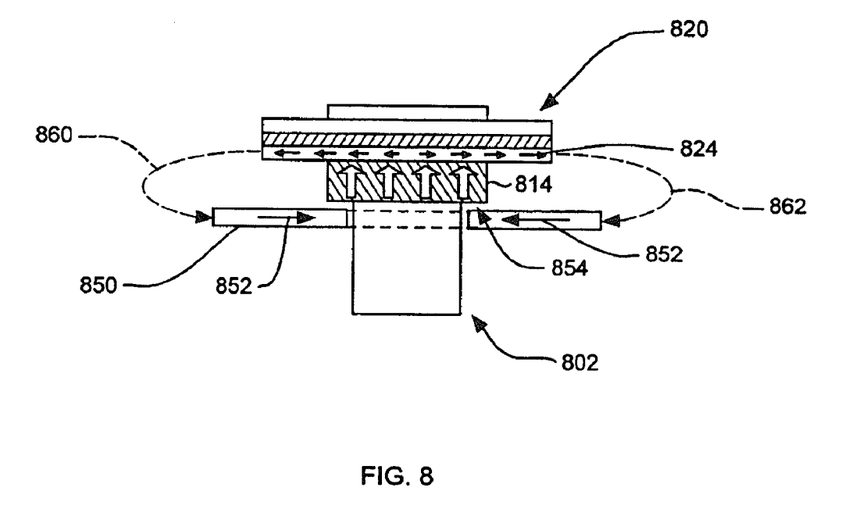
FIG. 8 is a schematic side section of a perpendicular recording disk having a Permanent magnetic bias clamp washer and an air gap coupled to a stationary flux return disk in accordance with the present invention.

FIG. 8 illustrates an embodiment in which a permanent magnetic ring washer 814 is placed on a non-ferromagnetic spindle 802 generally adjacent to the soft underlayer 824 of a disk 820. Additionally, a stationary flux return disk 850 is concentrically located around the spindle 802 and separated by an air gap 854 from the ring washer 814 as depicted in FIG. 8. The magnetic circuit includes the permanent magnetic ring washer 814, the soft underlayer 824 of the disk 820, and through air coupling as illustrated by the arrows 860, 862, into the stationary flux return disk 850 (as shown by the arrows 852), which is, in turn, and coupled across a thin air gap 854, with the washer. This arrangement moves the free poles at the bottom of the magnetic ring washer 814 out to a larger radius so that they add to the radial bias field of the soft underlayer 824 instead of reducing it, as illustrated by the arrows 860, 862 in FIG. 8.

Figure 9:
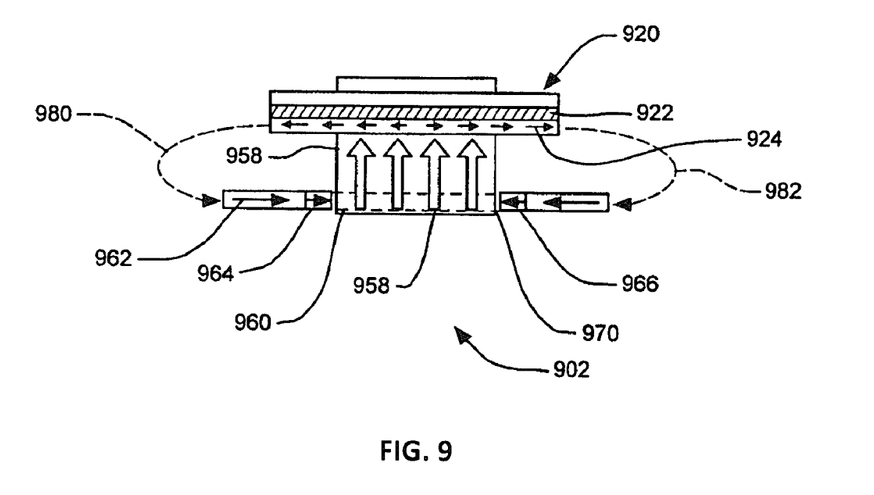
FIG. 9 is a schematic side section of a perpendicular recording disk on a ferromagnetic spindle where the soft underlayer is biased in accordance with the present invention with a stationary ring magnet and flux return disk.

FIG. 9 illustrates an embodiment of the present invention which employs a ferromagnetic spindle assembly. More specifically, the spindle 902 spins the disk 920 which has a data layer 922 and soft underlayer 924. The spindle 902 includes a ferromagnetic keeper ring 960. In this embodiment, the permanent magnetic ring 964 is stationary and a ferromagnetic flux return disk 962 is placed around an outer circumference of the permanent magnetic ring 964. The flux illustrated by the arrow 966 is coupled across a thin air gap 970 into the keeper ring 960. The flux path is illustrated by arrows 958. This flux travels in the magnetic circuit through the spindle structure and is emitted in a radial direction in the vicinity of the soft underlayer 924. The flux travels back via the air couple as shown by the arrows 980, 982 into the flux return disk 962. In this arrangement, substantially no eddy currents are generated in the metallic disks or other structures because the field is circumferentially uniform. Thus, FIG. 9 illustrates an embodiment of the invention in which the soft underlayer is radially biased using a spindle that is ferromagnetic and a stationary permanent magnet ring.

Figure 10:
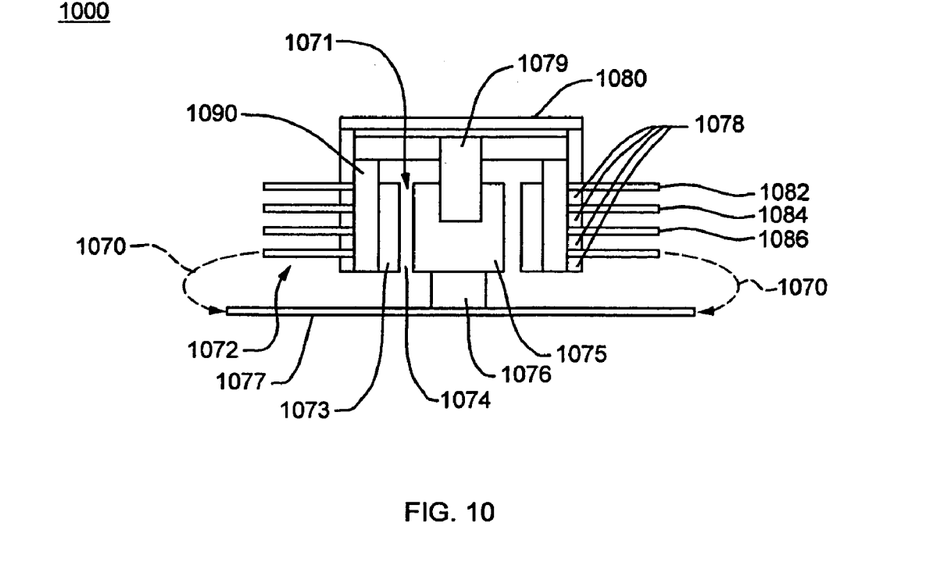
FIG. 10 is a schematic side section of a perpendicular recording disk on a ferromagnetic spindle where the soft underlayer is biased in accordance with the present invention by a radial magnetization component from the spindle assembly coupled through a magnetic circuit in accordance with an illustrative embodiment of the present invention.

FIG. 10 illustrates another embodiment of the invention in which a ferromagnetic spindle assembly is utilized. More specifically, FIG. 10 shows a cross section of spindle assembly 1000, which has a spindle rotor magnet 1074 and a spindle stator 1075. The perpendicular recording disk media 1072 is spun by the spindle assembly 1000. The spindle stator 1075 is supported by a ferromagnetic stator pedestal 1076 and a ferromagnetic base plate 1077 in accordance with the present invention. A disk clamp assembly includes spacer rings 1078, a spindle bearing assembly 1079 and an external clamp 1080 to maintain the various additional disk media platters 1082-1086 and other components in their relative positions while the disk media 1072 and the additional disk media platters are spinning on the spindle assembly 1000.

In accordance with the invention, the magnetization 1073 of the spindle assembly is set so that the magnetization has an overall radial component. The radial component thus travels from spindle motor 1074, through the keeper 1090, into the disk media 1072, through the air (arrows 1070) and back into the ferromagnetic base plate 1077 through the ferromagnetic pedestal 1076 and into the ferromagnetic stator 1075. To complete the circuit, the magnetic flux from the ferromagnetic stator 1075 travels across an air gap 1071 and back into the rotor magnet 1074. In this way, the soft underlayer of the disk media 1072 is radially biased by this arrangement. The additional disk media platters are biased in a manner similar to that described with reference to the disk media 1072.

Figure 11:
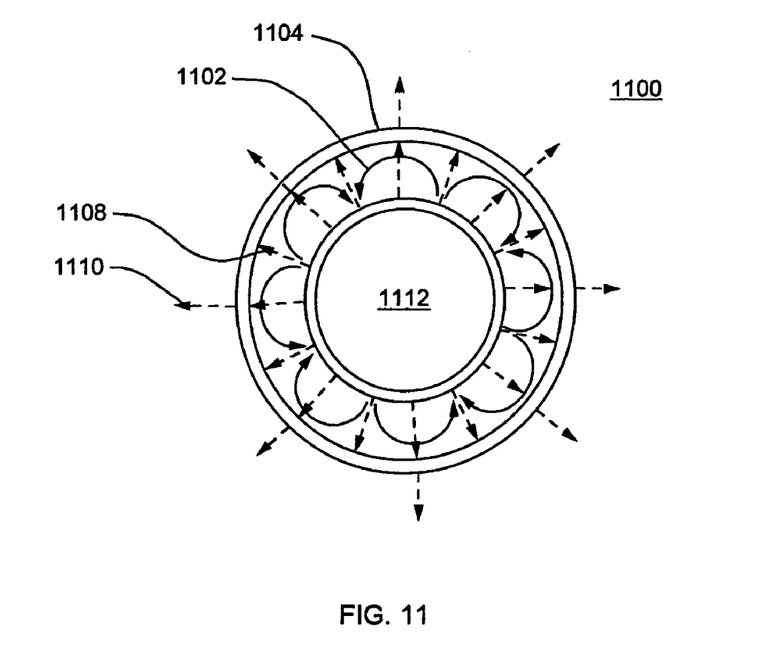
FIG. 11 is a top plan view of an illustrative spindle assembly for use in the embodiment of FIG. 10 which has a magnetization pattern that generates a net exterior field that biases the soft underlayer in accordance with illustrative embodiments of the present invention.

In accordance with an illustrative aspect of the invention, the magnetization pattern, of the biasing spindle assembly of FIG. 10 is illustrated in FIG. 11. FIG. 11 shows a spindle motor rotor 1100 that rotates around a spindle stator 1112. The magnetization pattern which is induced in accordance with the invention is primarily a Halbach magnetization pattern as illustrated by the arrows 1102, but with a partial radial magnetization pattern 1108. A moderately thick ferromagnetic keeper 1104 homogenizes the radial flux such that the mainly Halbach pattern 1102 confines most of the spindle rotor flux to remain within the rotor to prevent its interference with the soft underlayer or read head. However, the partial radial magnetization component 1108 emits a controlled amount of radial flux 1110 which in the embodiment of FIG. 10 travels into the soft underlayer of the disk 1072 and through an air gap (as depicted by arrow 1070) and back into the ferromagnetic return base plate 1077 in accordance with the embodiment of FIG. 10.

Figure 12:
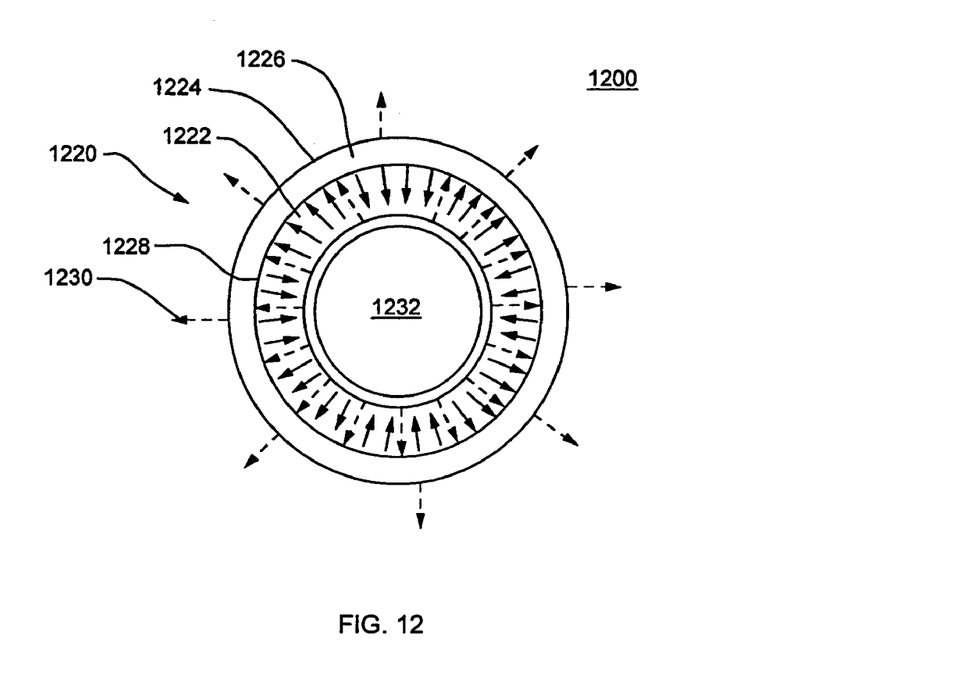
FIG. 12 illustrates an alternative spindle assembly for use in the embodiment of FIG. 10 which has a partial radial magnetization pattern combined with a dominant +/− radial pattern that generates a net exterior field that biases the soft underlayer in accordance with illustrative embodiments of the present invention.

An alternative aspect of the invention is illustrated in FIG. 12 which shows a spindle rotor motor 1220 having a thick ferromagnetic keeper ring 1224 and a stator 1232. A partial radial magnetization pattern 1228 combined with a dominant +/− radial pattern 1222 is induced in accordance with the invention. The thick keeper 1224 confines most of the spindle rotor flux within the motor to prevent its interference with the soft underlayer or read head, and a radial magnetization 1228 is emitted as a radial soft underlayer bias flux 1230 from the motor stator 1232 through the circuit as described in FIG. 10.

Figure 13:
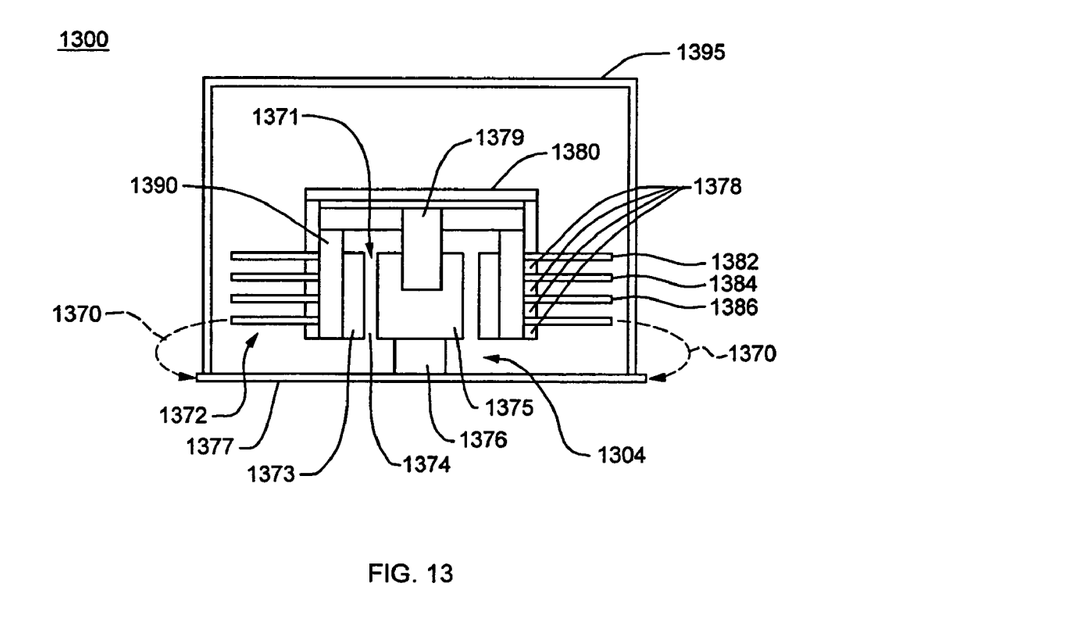
FIG. 13 is a schematic illustration of one embodiment of the disk drive assembly of the present invention enclosed within a shielding device for shielding external magnetic fields and in which the shielding device is part of the magnetic flux circuit in accordance with an illustrative embodiment of the present invention.

In certain applications of the invention, a magnetic shield is placed around the spindle assembly and disk media in order to shield the components from external magnetic fields. For example, many disk drives must operate in the vicinity of fairly high magnetic fields and must be able to do so without reduction in accuracy of the data being recorded or read from the disk. In accordance with this aspect of the invention, FIG. 13 illustrates a disk drive assembly 1300 having a perpendicular recorded disk media 1372 which has soft underlayers (not shown separately). The disk media 1372 spins on a spindle assembly 1304. The spindle assembly 1304 has a stator 1375, rotor magnet 1374 and a keeper 1390 which has been magnetized in accordance with one of the magnetization patterns previously described herein or another magnetization pattern which has a radial component, in accordance with the invention. Thus, the soft underlayer of the disk media 1372 is radially biased.

The disk assembly 1300 of FIG. 13 is similar to the disk assembly 1000 of FIG. 10 but in addition it has an enclosing ferromagnetic shield 1390 that couples to the ferromagnetic base plate 1377. Together the shield 1395 and the base plate 1377 shield the media 1372 from external fields that might interfere with the radial bias field provided by the motor magnet 1374 which has a radial component of magnetization according to the present invention. The shield 1395 and the base plate 1377 in addition to shielding external fields work together to enhance the radial bias field at the periphery of the disks by providing a low impedance return path for the bias field at a large radial distances from the motor magnet 1374 flux source. Thus the flux path originates with the radially biased rotor magnet 1374 and passes through: the keeper 1390; the disks 1372; the shield 1395; the base plate 1377; the ferromagnetic pedestal 1376; the stator 1375; the air gap 1371; and back into the motor magnetic 1374.

Figure 14:
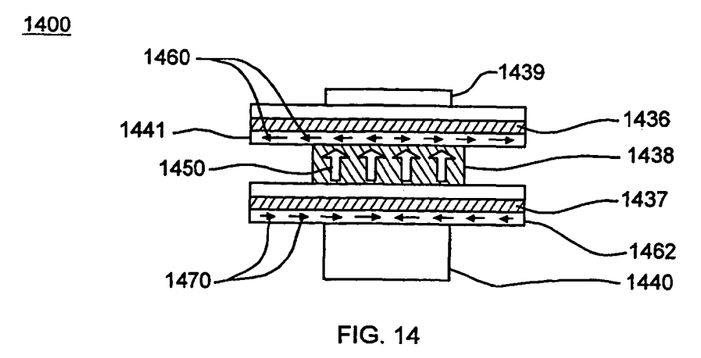
FIG. 14 is a schematic side section of a multiple platter disk drive that includes a permanent bias magnet sandwiched between the two disks in accordance with an illustrative embodiment of the present invention.

In accordance with an alternative aspect of the invention, FIG. 14 illustrates a schematic diagram of a multiple platter disk drive 1400, on a non-ferromagnetic spindle assembly 1440. The permanent bias magnet ring 1438 is sandwiched between a top disk platter 1436, and a bottom disk platter 1437, on the rotating disk drive motor spindle which has clamps 1439 and 1440. The clamps 1439 and 1440 ensure good mechanical contact between the platters 1436 and 1437 and the permanent magnet 1438, and the spindle assembly. The magnetic bias field in the ring 1438 (illustrated by the arrows 1450) aligns the magnetization of the soft underlayer 1441 of the top platter 1436 radially towards the outer portion of the disk radius as illustrated by the arrows 1460. The ring 1438 biases the soft underlayer 1462 of the bottom platter 1437 radially inwardly towards the inner radius of the spindle, as shown by the arrows 1470. The magnetization of the ring 1438 is aligned along the cylinder axis in this embodiment of the invention. However, the magnetization could be aligned radially, uniformly or several poles could exist in other implementation schemes in accordance with the present invention.

It should be understood that through the various embodiments shown and described herein assume some cylindrical symmetry, this is not required. Specifically, the bias field need only be applied in the general vicinity of the head (and this can be done dynamically) as domain walls that are a distance away from the head do not generate spike noise in the read back.

Figure 15:
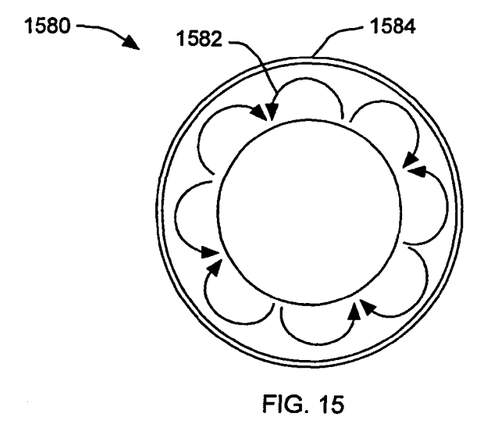
FIG. 15 is a schematic top plan view of a Halbach magnetization pattern for use with the permanent magnetic bias ring in accordance with illustrative embodiments of the present invention.

FIG. 15 illustrates a simplified Halbach magnetization pattern 1582 for a spindle motor rotor 1580. The spindle motor rotor 1580 has a thin ferromagnetic keeper 1584. This simple Halbach magnetization pattern is useful in accordance with the invention with the embodiments illustrated in FIGS. 6, 7, 8 and 14, which are for use with non-ferromagnetic spindle assemblies. The keeper 1584 confines the spindle motor flux to prevent its interference with the soft underlayer or read head without the need for a thick keeper that could short out the soft underlayer bias flux from the permanent magnet clamp rings.

Figure 16:
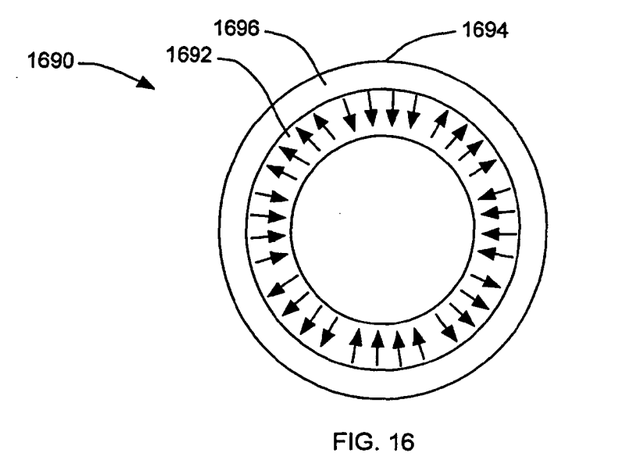
FIG. 16 is a top plan view of a spindle motor rotor with a thick ferromagnetic keeper on which a magnetization pattern is illustrated for use with illustrative embodiments of the present invention.

FIG. 16 is an alternative magnetization pattern 1692 for a spindle motor rotor 1690 which has a thick ferromagnetic keeper 1694. This type of magnetization pattern is useful in accordance with the embodiment illustrated in FIG. 9, which has a ferromagnetic flux return disk 962 placed around an outer circumference of a permanent magnetic ring 964 (FIG. 9) used with a ferromagnetic spindle assembly. The exterior flux 1696 of the pattern 1692 is confined by the thick keeper 1694 to prevent its interference with a soft underlayer or read head. The thick keeper 1694 of this commonly employed rotor 1690 could cancel the soft underlayer bias flux of some of the other embodiments of the present invention as discussed with reference to FIG. 15. However, the thick keeper 1594 is a portion of the path in the magnetic circuit of the embodiment of FIG. 9.

Figure 17A:
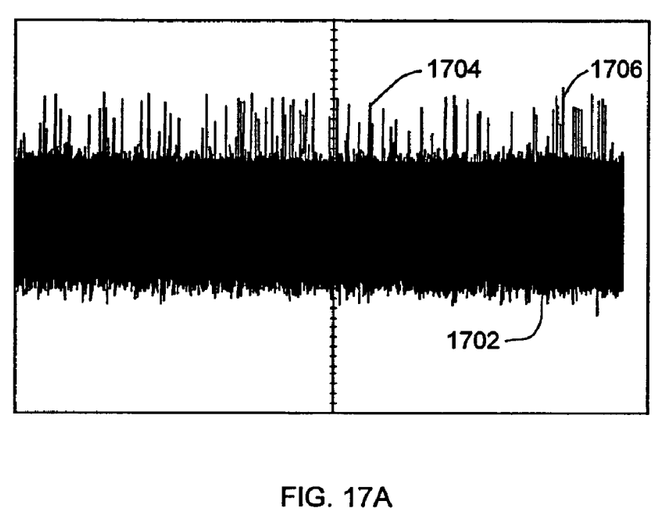
FIG. 17A is an oscilloscope wave form of a read back signal for a medium in which no bias field was applied illustrating random spike noise caused by domain walls in the soft underlayer.
Figure 17B:
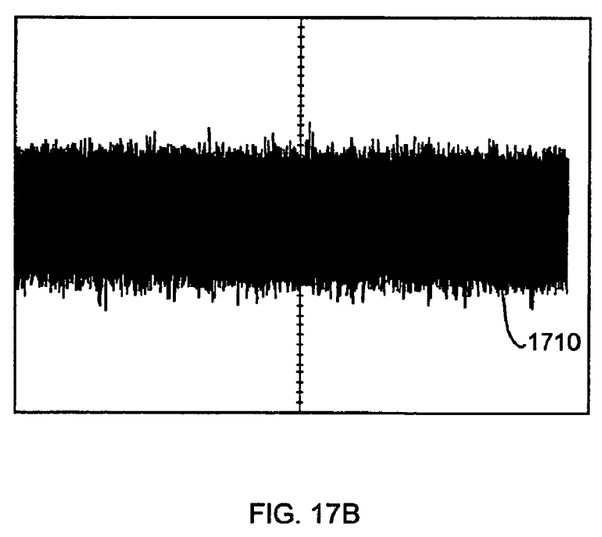
FIG. 17B is oscilloscope wave form of a read back signal for a medium in which a bias field was applied to the soft underlayer in accordance with the present invention and illustrating a significant reduction in spike noise in the soft underlayer.

FIGS. 17A and 17B are oscilloscope waveforms for tests performed to illustrate the effects of applying a radial bias to the soft underlayer in accordance with the invention. In each case, the medium was alternate current (AC) erased prior to the test so that it contained essentially no data, such that only noise is reflected in a read back signal from the medium. FIG. 17A is an oscilloscope wave form 1702 of the read back signal from a perpendicular recording medium in which no bias field was applied to the soft underlayer. The read back signal exhibits high-amplitude random spike noise 1704, 1706, for example, which could adversely affect the read back of data in the storage layer.

FIG. 17B is an oscilloscope wave form 1710 of the read back signal taken from a perpendicular recording medium having a soft underlayer that has been radially biased in accordance with the present invention. The bias field in the example of FIG. 17B was on the order of approximately 50

Oersteads. A significant reduction in spike noise is apparent from FIG. 17B, as compared to that of FIG. 17A.

Figure 18:
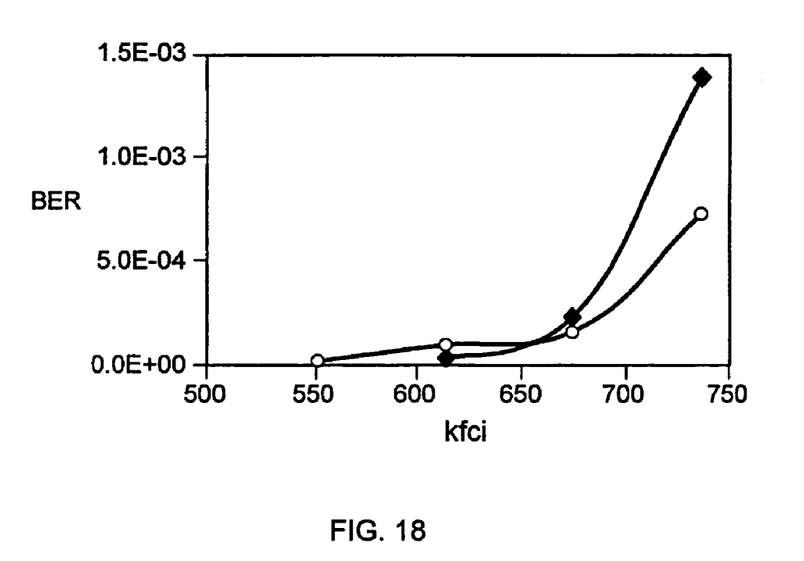
FIG. 18 is a graph of the error rate versus kilo flux change per inch (kfci) illustrating the bit error rate performance being improved by an order of magnitude with a biased magnetic field application in accordance with the present invention.

FIG. 18 is a plot of bit error ratio (BER) on the y-axis versus kilo flux change per inch (kfci) on the x-axis. The bit error ratio test of the non-biased soft underlayer is shown on the curved marked with diamonds. The bit error ratio test for the radially-biased soft underlayer is illustrated on the curve having points marked as circles. As is apparent from FIG. 18, the BER is improved with a biased magnetic field application in accordance with the invention.

Figure 19:
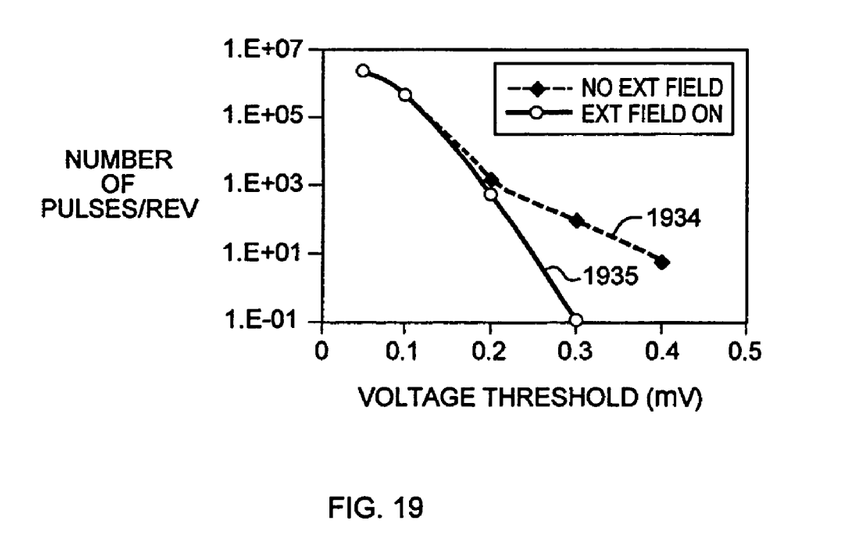
FIG. 19 is a graph of a number of pulses per revolution versus voltage throughout the threshold in milli-volts (mV) showing spike noise measurements for a perpendicular recording medium with no bias field applied, and in which a biased field has been applied in accordance with the present invention.

FIG. 19 is a plot of number of pulses per revolution on the y-axis versus voltage in milli volts on the x-axis. Spike noise measurements were used to quantify the effect of the external magnetic field on the spike noise in the perpendicular recording medium. Curve 1934 illustrates the results when no bias field was applied. Application of the magnetic bias field in accordance with the invention drastically reduces the spikes over the 0.2 mV threshold level, as shown by the curve 1935.

It should be appreciated that the present invention provides a number of alternative embodiments for applying a radial bias to the soft underlayer of a perpendicular recording magnetic disk in order to eliminate domain walls thereby reducing spike noise. In accordance with one aspect of the invention, a simple ring washer can be employed in the magnetic circuit around the disk. In alternative embodiments, the magnetization pattern of spindle assembly can be modified to provide a primarily radial component to thereby radially bias the adjacent soft underlayer of the disk media.

While the invention has been particularly shown and described with reference to preferred embodiments thereof, it will be understood by those skilled in the art that various changes in form and details can be made without departing from the spirit and scope of the invention. Furthermore, the terms and expressions that have been employed herein are used as terms of descriptions and not of limitation. There is no intention in the use of such terms and expressions of excluding any equivalents of the features shown and described or portions thereof. It is recognized that various modifications are possible within the scope of the invention claimed.

What is claimed is:

1. An apparatus for reducing spike noise in a perpendicular recording medium, having a data layer, comprising:
   a spindle assembly adapted to support and rotate the perpendicular recording medium; and
   a permanent magnetic bias ring disposed as a clamp washer generally adjacent a soft underlayer of the perpendicular recording medium, said magnetic clamp washer being magnetized in such a manner that said soft underlayer is radially biased while not adversely affecting the data layer.

2. The apparatus as defined in claim 1 further comprising a flux conducting washer disposed between said soft underlayer and said permanent magnetic bias ring.

3. The apparatus as defined in claim 1 further comprising a stationary flux return disk coupled to the permanent magnetic bias ring are at a large radius with respect to the recording medium and the bias field the soft underlayer is extended outwardly towards an outer circumferential edge thereof.

4. The apparatus as defined in claim 1 wherein said spindle assembly produces a Halbach pattern of magnetization.

5. The apparatus as defined in claim 1 wherein said spindle assembly has a ferromagnetic keeper and said permanent magnetic bias ring is magnetized with a pattern of magnetization that alternates in a +/− radial direction.

6. The apparatus as defined in claim 1 further comprising:
   a magnetic shield disposed around the spindle assembly to shield the perpendicular recording medium from external magnetic fields.

7. The apparatus as defined in claim 1 wherein the permanent magnetic bias ring comprises ferrite particles and a conductive epoxy.

8. The apparatus as defined in claim 1 wherein the permanent magnetic bias ring is magnetized in a perpendicular direction relative to a plane of the permanent magnetic bias ring.

9. The apparatus as defined in claim 1 wherein the permanent magnetic bias ring is magnetized in a longitudinal direction relative to a plane of the permanent magnetic bias ring.

10. The apparatus as defined in claim 1 wherein the perpendicular recording medium includes a first disk and a second disk and the permanent magnetic bias ring is between the first disk and the second disk.

11. An apparatus for reducing spike noise in a perpendicular recording disk drive system, comprising:
    a perpendicular recording disk medium having a data layer and a soft underlayer;
    a spindle assembly adapted to support and rotate said perpendicular recording disk medium;
    a stationary permanent magnetic ring disposed around said spindle assembly generally proximate to said soft underlayer; and
    a flux return disk placed around an outer circumference of said stationary magnetic ring assembly to form a magnetic circuit through said permanent magnetic ring, an air gap and said soft underlayer of the perpendicular recording medium, and returning through said flux return path, such that said soft underlayer is radially biased magnetically.

12. An apparatus for reducing spike noise in a perpendicular recording medium having a soft underlayer and a data layer, comprising:
    a ferromagnetic spindle assembly adapted to support and rotate the perpendicular recording medium, the ferromagnetic spindle assembly having a ferromagnetic keeper ring; and
    a stationary permanent magnetic bias ring disposed around the ferromagnetic spindle assembly, the stationary permanent magnetic bias ring being magnetized in such a manner that the soft underlayer is radially biased while not adversely affecting the data layer.

13. The apparatus as defined in claim 12 further comprising:
    a flux return disk placed around an outer circumference of the stationary magnetic ring.

14. The apparatus as defined in claim 12 wherein the permanent magnetic bias ring comprises ferrite particles and a conductive epoxy.

15. The apparatus as defined in claim 12 wherein the permanent magnetic bias ring is magnetized in a perpendicular direction relative to a plane of the permanent magnetic bias ring.

16. The apparatus as defined in claim 12 wherein the perpendicular recording medium includes a first disk and a second disk that are supported and rotated by the ferromagnetic spindle.

17. The apparatus as define in claim 12 further comprising:
    a shield encompassing the ferromagnetic spindle assembly to prevent external magnetic fields from affecting the magnetization of the soft underlayer and the spindle assembly.

18. The apparatus as defined in claim 12 wherein the spindle assembly produces an alternating radial magnetization pattern that has a radial component that generates a net exterior field that radially biases the soft underlayer of the perpendicular recording medium.

19. The apparatus as defined in claim 12 wherein the spindle assembly includes a spindle rotor magnet and a spindle stator.

20. The apparatus as defined by claim 19 further comprising:
   a stator pedestal coupled to the spindle stator; and
   a base plate coupled to the stator pedestal.

* * * * *